United States Patent
Kishimoto et al.

(10) Patent No.: US 11,331,625 B2
(45) Date of Patent: May 17, 2022

(54) GAS TREATMENT METHOD AND GAS TREATMENT APPARATUS

(71) Applicants: Kobe Steel, Ltd., Kobe (JP); National University Corporation Tokai National Higher Education and Research System, Nagoya (JP)

(72) Inventors: Akira Kishimoto, Kobe (JP); Katsuya Akiyama, Kobe (JP); Hiroshi Machida, Aichi (JP); Tsuyoshi Yamaguchi, Aichi (JP); Takehiro Esaki, Aichi (JP); Koyo Norinaga, Aichi (JP)

(73) Assignees: Kobe Steel, Ltd., Kobe (JP); National University Corporation Tokai National Higher Education and Research System, Nagoya (JP)

( * ) Notice: Subject to any disclaimer, the term of this patent is extended or adjusted under 35 U.S.C. 154(b) by 39 days.

(21) Appl. No.: 16/766,915

(22) PCT Filed: Nov. 12, 2018

(86) PCT No.: PCT/JP2018/041882
§ 371 (c)(1),
(2) Date: May 26, 2020

(87) PCT Pub. No.: WO2019/107136
PCT Pub. Date: Jun. 6, 2019

(65) Prior Publication Data
US 2021/0016226 A1    Jan. 21, 2021

(30) Foreign Application Priority Data
Nov. 30, 2017 (JP) ............................. JP2017-229936

(51) Int. Cl.
*B01D 53/14* (2006.01)
*B01D 53/18* (2006.01)
(Continued)

(52) U.S. Cl.
CPC ......... *B01D 53/96* (2013.01); *B01D 53/1425* (2013.01); *B01D 53/1475* (2013.01);
(Continued)

(58) Field of Classification Search
CPC ............... B01D 19/00; B01D 53/1475; B01D 53/1481; B01D 53/40; B01D 53/50;
(Continued)

(56) References Cited

U.S. PATENT DOCUMENTS 4,198,378 A * 4/1980 Giammarco .............. C01B 3/52
423/220
8,318,117 B2 * 11/2012 Lichtfers ................... C10L 3/10
423/228

(Continued)

FOREIGN PATENT DOCUMENTS

| CN | 1300635 A | 6/2001 |
| CN | 106422667 A | 2/2017 |

(Continued)

OTHER PUBLICATIONS

International Search Report dated Jan. 22, 2019 in PCT/JP2018/041882 filed Nov. 12, 2018, 2 pages.

(Continued)

*Primary Examiner* — Timothy C Vanoy
(74) *Attorney, Agent, or Firm* — Oblon, McClelland, Maier & Neustadt, L.L.P.

(57) ABSTRACT

A gas treatment method includes an absorption step in which a gas to be treated containing an acidic compound, such as carbon dioxide, is brought into contact, in an absorber, with a treatment liquid that absorbs the acidic compound; and a (Continued)

regeneration step in which the treatment liquid, having the acidic compound absorbed therein, is sent to a regenerator, and the treatment liquid is then heated to separate the acidic compound from the treatment liquid. In the regeneration step, a gas almost insoluble to the treatment liquid, such as hydrogen gas, is brought into contact with the treatment liquid.

19 Claims, 12 Drawing Sheets

(51) Int. Cl.
*B01D 53/50* (2006.01)
*B01D 53/62* (2006.01)
*B01D 53/68* (2006.01)
*B01D 53/78* (2006.01)
*B01D 53/96* (2006.01)

(52) U.S. Cl.
CPC ......... *B01D 53/1481* (2013.01); *B01D 53/18* (2013.01); *B01D 53/507* (2013.01); *B01D 53/62* (2013.01); *B01D 53/68* (2013.01); *B01D 53/78* (2013.01); *B01D 2252/20405* (2013.01); *B01D 2252/20421* (2013.01); *B01D 2252/20484* (2013.01); *B01D 2257/2045* (2013.01); *B01D 2257/302* (2013.01); *B01D 2257/504* (2013.01)

(58) Field of Classification Search
CPC ........ B01D 53/62; B01D 53/74; B01D 53/78; B01D 2252/204; B01D 2257/302; B01D 2257/504; B01D 2258/0283; Y02C 20/00; Y02C 20/40; C10L 3/102; C10L 3/103; C10L 3/104
See application file for complete search history.

(56) References Cited

U.S. PATENT DOCUMENTS

| | | | |
|---|---|---|---|
| 8,361,426 B2* | 1/2013 | Lichtfers | ................... C10L 3/10 |
| | | | 423/228 |
| 9,573,093 B2* | 2/2017 | Menzel | ................... C10L 3/102 |
| 2011/0094381 A1 | 4/2011 | Lichtfers et al. | |
| 2011/0135549 A1 | 6/2011 | Lichtfers et al. | |

FOREIGN PATENT DOCUMENTS

| | | |
|---|---|---|
| JP | 53-44651 | 4/1978 |
| JP | H05-084422 A | 4/1993 |
| JP | 2011-525422 A | 9/2011 |
| JP | 2011-525423 A | 9/2011 |
| JP | 2011-213494 A | 10/2011 |
| JP | 2012-527992 A | 11/2012 |
| WO | WO 2013/114936 A1 | 8/2013 |
| WO | WO 2013/114937 A1 | 8/2013 |

OTHER PUBLICATIONS

Extended European Search Report dated Mar. 29, 2021 in European Patent Application No. 18882476.7, 11 pages.

Ehsan Kianfar, et al., "An experimental study on absorption/stripping $CO_2$ using mono-ethanol amine hollow fiber membrane contactor," Journal of the Taiwan Institute of Chemical Engineers, vol. 80, XP055784523, 2017, pp. 954-962.

A.J. Reynolds, et al., "Degradation of amine-based solvents," Elsevier, XP055784451, 2016, pp. 399-423.

\* cited by examiner

FIG.2

ABSORPTION 40°C, PCO2=0.2atm
MEA

| GAS-TO-LIQUID RATIO | 40°C | 50°C | 60°C | 70°C | 80°C | 90°C |
|---|---|---|---|---|---|---|
| l/g | % | % | % | % | % | % |
| 0 | 0 | 0 | 0 | 3.5 | 8.9 | 11.6 |
| 0.005 | 2 | 4 | 7 | 13 | 20 | 28 |
| 0.05 | 14 | 22 | 27 | 33 | 40 | 47 |
| 0.1 | 20 | 28 | 33 | 40 | 46 | 53 |
| 0.15 | 24 | 31 | 37 | 43 | 49 | 56 |
| 0.2 | 26 | 34 | 40 | 46 | 52 | 58 |
| 0.25 | 28 | 36 | 42 | 48 | 54 | 60 |
| 0.3 | 29 | 37 | 43 | 49 | 55 | 62 |
| 0.35 | 31 | 38 | 45 | 51 | 57 | 63 |
| 0.4 | 32 | 40 | 46 | 52 | 58 | 64 |
| 0.45 | 33 | 41 | 47 | 53 | 59 | 65 |

FIG.4

ABSORPTION 40°C, PCO2=0.2atm
PHASE SEPARATION

| GAS-TO-LIQUID RATIO | 40°C | 50°C | 60°C | 70°C | 80°C | 90°C |
|---|---|---|---|---|---|---|
| l/g | % | % | % | % | % | % |
| 0 | 0 | 0 | 9.5 | 25.8 | 55.1 | 71.3 |
| 0.005 | 3 | 7 | 23 | 46 | | |
| 0.05 | 13 | 40 | 75 | 100 | | |
| 0.1 | 23 | 56 | 92 | 100 | | |
| 0.15 | 35 | 67 | 99 | 100 | | |
| 0.2 | 43 | 75 | 100 | 100 | | |
| 0.25 | 50 | 81 | 100 | 100 | | |
| 0.3 | 56 | 86 | 100 | 100 | | |
| 0.35 | 61 | 89 | 100 | 100 | | |
| 0.4 | 65 | 92 | 100 | 100 | | |
| 0.45 | 68 | 95 | 100 | 100 | | |

FIG.6

ABSORPTION 40°C, PCO2=0.2atm
REGENERATION 40°C

| GAS-TO-LIQUID RATIO | PHASE SEPARATION | MEA |
|---|---|---|
| l/g | % | % |
| 0 | 0 | 0 |
| 0.05 | 13 | 14 |
| 0.1 | 23 | 20 |
| 0.15 | 35 | 24 |
| 0.2 | 43 | 26 |
| 0.25 | 50 | 28 |
| 0.3 | 56 | 29 |
| 0.35 | 61 | 31 |
| 0.4 | 65 | 32 |
| 0.45 | 68 | 33 |

FIG.8

ABSORPTION 60°C, PCO2=0.2atm
REGENERATION 60°C

| GAS-TO-LIQUID RATIO | PHASE SEPARATION | MEA |
|---|---|---|
| l/g | % | % |
| 0 | 0 | 0 |
| 0.05 | 54 | 16 |
| 0.1 | 86 | 23 |
| 0.15 | 98 | 28 |
| 0.2 | 100 | 31 |
| 0.25 | 100 | 33 |
| 0.3 | 100 | 35 |
| 0.35 | 100 | 36 |
| 0.4 | 100 | 38 |
| 0.45 | 100 | 39 |

GAS TREATMENT METHOD AND GAS TREATMENT APPARATUS

TECHNICAL FIELD

The present invention relates to a gas treatment method and a gas treatment apparatus.

BACKGROUND ART

A known gas treatment method brings a gas to be treated containing an acidic compound into contact with a treatment liquid, to separate the acidic compound. An exemplary gas treatment method disclosed in Patent Literature 1 below employs a gas treatment apparatus having an absorber and a regenerator. The absorber brings the gas to be treated into contact with the treatment liquid, so as to make the treatment liquid absorb the acidic compound in the gas to be treated. The regenerator heats the treatment liquid, to thereby separate the acidic compound from the treatment liquid.

The conventional gas treatment method can recover carbon dioxide, by bringing, in the absorber, carbon dioxide into contact with the treatment liquid so as to be absorbed therein, and then by heating the treatment liquid in the regenerator. Energy required in this process typically amounts 4 GJ/ton-CO2. The present inventors have developed a technology for regenerating carbon dioxide at a temperature lower than before, by using an absorbent that can cause phase separation upon absorbing carbon dioxide. The present inventors have also confirmed that the energy could be reduced down to 1.5 GJ/ton-CO2 with combination of a heat-pump.

With a growing interest on the global environment, awaited is a technology capable of separating and recovering the acidic compound with lesser energy consumption.

CITATION LIST

Patent Literature

Patent Literature 1: JP 2011-213494 A

SUMMARY OF INVENTION

An object of the present invention is to reduce the energy required for separating and recovering the acidic compound.

According to an aspect of the present invention, there is provide a gas treatment method including an absorption step in which a gas to be treated containing an acidic compound is brought into contact, in an absorber, with a treatment liquid absorbing the acidic compound, and a regeneration step in which the treatment liquid, having the acidic compound absorbed therein, is sent to a regenerator, and the treatment liquid is then heated to separate the acidic compound from the treatment liquid. In the regeneration step, a gas almost insoluble to the treatment liquid being fed to the regenerator, and the gas almost insoluble to the treatment liquid being then brought into contact with the treatment liquid.

According to an aspect of the present invention, there is provide a gas treatment apparatus that uses a gas to be treated containing an acidic compound, and a treatment liquid for absorbing the acidic compound, to thereby separate the acidic compound from the gas to be treated, the gas treatment apparatus including an absorber configured to bring the treatment liquid into contact with the gas to be treated, a regenerator configured to heat the treatment liquid, having been brought into contact in the absorber with the gas to be treated, to thereby separate the acidic compound, and a gas feeding unit for feeding a gas almost insoluble to the treatment liquid to the regenerator.

BRIEF DESCRIPTION OF DRAWINGS

FIG. 2 is a drawing illustrating a list of regeneration rate (%) observed using an aqueous MEA solution, under varied regeneration temperatures.

FIG. 4 is a drawing illustrating a list of regeneration rate (%) observed using a treatment liquid capable of causing phase separation upon absorbing carbon dioxide, under varied regeneration temperatures.

FIG. 6 is a drawing illustrating a list of regeneration rate (%) observed using the phase-separable treatment liquid and the aqueous MEA solution, both at an absorption temperature and a regeneration temperature of 40° C.

FIG. 8 is a drawing illustrating a list of regeneration rate (%) observed using the phase-separable treatment liquid and the aqueous MEA solution, both at an absorption temperature and a regeneration temperature of 60° C.

DESCRIPTION OF EMBODIMENTS

Embodiments of the present invention will now be described below referring to the attached drawings. Note that the embodiments below are provided merely for illustrative purposes of the present invention, and by no means limit the technical scope of the present invention.

First Embodiment

Figure 1:
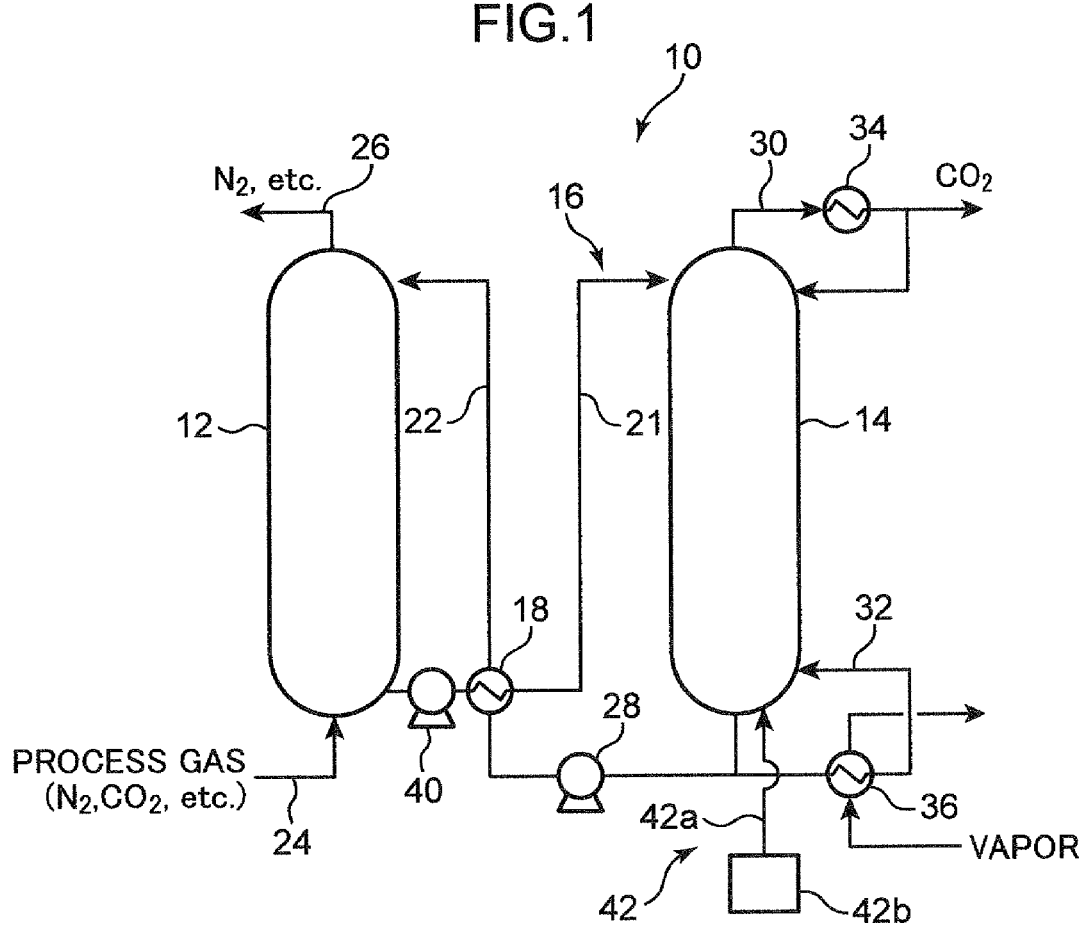
FIG. 1 is a drawing schematically illustrating an overall structure of a gas treatment apparatus according to a first embodiment.

A gas treatment apparatus 10 according to a first embodiment is used for separating an acidic compound from a gas to be treated containing the acidic compound, using a treatment liquid. The gas treatment apparatus 10 has, as illustrated in FIG. 1, an absorber 12, a regenerator 14, a circulation channel 16, and a heat exchanger 18. The circulation channel 16 includes a first flow channel 21 through which the treatment liquid drawn out from the absorber 12 is fed into the regenerator 14, and a second flow channel 22 through which the treatment liquid drawn out from the regenerator 14 is returned back to the absorber 12. The heat exchanger 18 is omissible.

The absorber 12 has, connected thereto, a feed channel 24 through which the gas to be treated such as process gas is fed, a gas discharge channel 26 through which a gas after processed is discharged, the first flow channel 21 through which the treatment liquid is fed to the regenerator 14, and a second flow channel 22 through which the treatment liquid is returned from the regenerator 14 back into the absorber 12. The feed channel 24 is connected to the bottom end of the absorber 12. The gas discharge channel 26 is connected to the top end of the absorber 12. The first flow channel 21 is connected to the bottom end or the vicinity of the bottom end of the absorber 12. That is, the first flow channel 21 is connected to the absorber 12 at a point where the treatment liquid pooled in the absorber 12 can be drawn out. The second flow channel 22 is connected to the top end or the vicinity of the top end of the absorber 12. That is, the second flow channel 22 is connected to the absorber 12 at a point where the treatment liquid returned from the regenerator 14 can fall from above.

In the absorber 12, the gas to be treated and the treatment liquid are brought into contact, and thereby the acidic compound contained in the gas to be treated is separated from the gas to be treated and absorbed in the treatment liquid. After all, the gas freed from the acidic compound is discharged from the absorber 12. This sort of absorber 12 may have any structure so long as it can bring the gas to be treated in to contact continuously with the treatment liquid, and may employ a reactor configured so as to spray the treatment liquid in the flow channel of the gas to be treated, configured so as to allow the treatment liquid to flow down through a filler arranged in the flow channel of the gas to be treated, or configured so as to introduce the gas to be treated and the treatment liquid individually into a large number of fine flow channels, and then combining such fine flow channels for the gas to be treated and the fine flow channels for the treatment liquid. Absorption of the acidic compound that takes place in the absorber 12 is an exothermic reaction. Carbon dioxide, when representing the acidic compound, gives a calorific value of approximately 1.8 GJ per ton of absorption. The reaction heat generated in the absorber 12 elevates temperature of the gas to be treated and the treatment liquid.

The regenerator 14 has, connected thereto, the first flow channel 21 and the second flow channel 22. The first flow channel 21 is connected to top part of the regenerator 14, and allows the treatment liquid drawn out from the absorber 12 to be fed into the regenerator 14. The first flow channel 21 has a pump 40 arranged thereto. The second flow channel 22 is connected to the bottom end or the vicinity of the bottom end of the regenerator 14, and allows the treatment liquid pooled in the regenerator 14 to be drawn out. The second flow channel 22 has a pump 28 arranged thereto.

The regenerator 14 pools the treatment liquid having the acidic compound absorbed therein. The pooled treatment liquid is heated in the regenerator 14 to release the acidic compound. Release of the acidic compound from the treatment liquid is an endothermic reaction. Upon heating of the treatment liquid in the regenerator 14, not only the acidic compound is released, but also water in the treatment liquid vaporizes.

The regenerator 14 has connected thereto a supply channel 30 and a heating flow channel 32. The supply channel 30 feeds the acidic compound obtained in the regenerator 14 to a supply destination. The supply channel 30 has arranged thereto a condenser 34 that cools a mixed gas composed of a gas of the acidic compound vaporized from the treatment liquid and water vapor. Upon cooling of the mixed gas, the water vapor condenses. Thus the water vapor is separated through the condenser 34. The thus separated water vapor is returned back to the regenerator 14. The condenser 34 may be composed of a heat exchanger that uses an inexpensive cooling water such as river water.

One end of the heating flow channel 32, connected to the second flow channel 22, may alternatively be connected to the bottom end or the vicinity of the bottom end of the regenerator 14. The other end of the heating flow channel 32 is connected to the lower part of the regenerator 14.

The heating flow channel 32 has arranged thereto a reboiler 36 that heats the treatment liquid pooled in the regenerator 14. Although the reboiler 36 may be arranged inside the regenerator 14 so as to heat the treatment liquid, it may alternatively be configured as illustrated in the drawing so as to heat the treatment liquid drawn outside the regenerator 14. The reboiler 36 in this case may be arranged to the heating flow channel 32 for returning to the regenerator 14 after heating. The reboiler 36 employable here may be any of those capable of directly or indirectly heating the treatment liquid, with a freely selectable heat source using electricity, vapor, burner or the like.

The heat exchanger 18 is connected to the first flow channel 21 and the second flow channel 22, enabling heat exchange between the treatment liquid that flows through the first flow channel 21 and the treatment liquid that flows through the second flow channel 22. The heat exchanger 18 is typically composed of a plate heat exchanger, but not limited thereto. The heat exchanger 18 may be composed of a micro-channel heat exchanger capable of causing heat exchange between fluids having a relatively small difference of temperature. This successfully improves energy efficiency.

The gas treatment apparatus 10 has a gas feeding unit 42 that feeds a gas for promoting separation of the acidic compound (referred to as "separation promoting gas", hereinafter) to the regenerator 14. The gas feeding unit 42 has a gas channel 42a connected to the bottom end or the vicinity of the bottom end of the regenerator 14. The gas channel 42a is typically connected to a supply source 42b of the separation promoting gas.

The separation promoting gas, fed from the gas feeding unit 42 to the regenerator 14, is a gas almost insoluble to the treatment liquid. The separation promoting gas is exemplified by hydrogen gas, oxygen gas, and methane gas. With the gas almost insoluble to the treatment liquid fed to the regenerator 14, separation of the acidic compound in the regenerator 14 is promoted. Now "almost insoluble" to the treatment liquid may represent that the solubility in the treatment liquid is not larger than a predetermined value. The separation promoting gas will suffice if it conforms to Henry's law, and has a solubility of 1 mol or smaller in 100 g of the treatment liquid at 0° C. and under 100 kPa. Oxygen has a solubility of $1.3 \times 10^{-4}$ mol/100 g in water, methane has a solubility of $8 \times 10^{-4}$ mol/100 g in water, and hydrogen has a solubility of $9.5 \times 10^{-5}$ mol/100 g in water. In contrast, ammonia having a solubility of 6 mol/100 g in water does not fall under such gas.

The acidic compound to be separated by the gas treatment apparatus 10 is not specifically limited so long as the aqueous solution thereof becomes acidic, and is exemplified by hydrogen chloride, carbon dioxide, sulfur dioxide, and carbon disulfide. The gas to be treated containing the acidic compound is exemplified by industrial effluent gas, natural gas and hydrogen gas. That is, the gas treatment apparatus 10 of this embodiment is applicable for the purpose of removing hazardous substances from gases emitted to the atmosphere, or for the purpose of removing impurities from gases used typically as fuel.

This embodiment employs, as the treatment liquid (absorbent) used for the gas treatment apparatus 10, an absorbent capable of reversibly absorbing and releasing the acidic compound. The treatment liquid is an alkaline absorbent typically containing water, an amine compound, and an organic solvent. The amine compound may account for 30 wt %, the organic solvent for 60 wt %, and water for 10 wt %. The treatment liquid preferably causes phase separation upon absorbing the acidic compound that produces an acid when dissolved in water, but is not limited thereto. The treatment liquid may typically be an aqueous solution of an amine compound, free of organic solvent. Again alternatively, the treatment liquid may be an amine compound, organic solvent, ionic liquid, or mixture or aqueous solution of these compounds.

The amine compound is exemplified by primary amines such as 1,3-diaminopropane (DAP: solubility parameter=14.6 $(cal/cm^3)^{1/2}$), 2-aminoethanol (MEA: solubility parameter=14.3 $(cal/cm^3)^{1/2}$), DL-2-amino-1-propanol (AP: solubility parameter=13.3 $(cal/cm^3)^{1/2}$), 2-(2-aminoethoxy)ethanol (AEE: solubility parameter=12.7 $(cal/cm^3)^{1/2}$), and (R)-4-amino-2-methyl-1-butanol (AMB); secondary amines such as 2-(methylamino)ethanol (MAE), 2-(ethylamino)ethanol (EAE), and 2-(butylamino)ethanol (BAE); and tertiary amines such as triethanolamine (TEA), N-methyldiethanolamine (MDEA), tetramethylethylene diamine (TEMED), pentamethyldiethylene triamine (PMDETA), hexamethyltriethylene tetramine, and bis(2-dimethylaminoethyl) ether.

The organic solvent is exemplified by 1-butanol (solubility parameter=11.3$(cal/cm^3)^{1/2}$), 1-pentanol (solubility parameter=11.0$(cal/cm^3)^{1/2}$), octanol, diethylene glycol diethyl ether (DEGDEE), and diethylene glycol dimethyl ether (DEGDME). Two or more kinds of them may be used in a combined manner.

If each of the amine compound and the organic solvent has the solubility parameter within a predetermined range, the treatment liquid upon absorbing the acidic compound will be separated into an acidic compound-rich phase and an acidic compound-deficient phase. The solubility parameter is given by equation (1) below.

[Math. 1]

$$\delta = \sqrt{(\Delta H - RT)/V} \quad (1)$$

$\Delta H$ represents molar latent heat of vaporization, R represents the gas constant, T represents absolute temperature, and V represents molar volume. The solubility parameter of EAE and MAE as the amine compounds, and DEGDME as the organic solvent, calculated using equation (1) are found to be 10.94, 11.58 and 7.75, respectively.

TABLE 1

| Solubility parameter difference/Two-phase separation capability | | Organic solvent/ Solubility parameter $[cal/cm^3)^{1/2}]$ | | |
|---|---|---|---|---|
| | | 1-butanol 11.3 | 1-pentanol 11.0 | DEGDEE 8.2 |
| Amine compound/ Solubility parameter $[cal/cm^3)^{1/2}]$ | DAP 14.6 | 3.3 Good | 3.6 Good | 6.5 Not mixed |
| | MEA 14.3 | 3.0 Good | 3.3 Good | 6.1 Not mixed |
| | AP 13.3 | 2.0 Good | 2.3 Good | 5.1 Not mixed |
| | AEE 12.7 | 1.4 Good | 1.7 Good | 4.5 Not mixed |
| | MAE 12.5 | 1.2 Good | 1.5 Good | 4.4 Not mixed |
| | EAE 12.0 | 0.7 Not separated | 1.0 Not separated | 3.8 Good |
| | AMB 8.8 | −2.5 Not separated | −2.2 Not separated | 0.6 Not separated |

As summarized in Table 1, the treatment liquid separates, upon absorbing the acidic compound, into the acidic compound-rich phase and the acidic compound-deficient phase, when the absorbent (treatment liquid) containing water, amine compound and organic solvent, is based on a combination of the amine compound and the organic solvent, properly selected so as to give a difference, remained after subtracting the solubility parameter of the organic solvent from the solubility parameter of the amine compound, of 1.1 $(cal/cm^3)^{1/2}$ or larger and 4.2 $(cal/cm^3)^{1/2}$ or smaller. If the difference of the solubility parameters is smaller than the lower limit value, the treatment liquid would not separate into two phases, upon absorbing the acidic compound. Meanwhile, if the difference of the solubility parameters exceeds the upper limit value, the treatment liquid would separate into two phases, before absorbing the acidic compound. This would destabilize uniform contact between the treatment liquid and the gas to be treated containing the acidic compound, in the process where the treatment liquid is brought into contact with the gas to be treated containing the acidic compound, and would degrade the absorption efficiency. "Good" in Table 1 means that the treatment liquid remains in a single liquid phase before absorbing carbon dioxide, and separates into two phases upon absorbing carbon dioxide. "Not mixed" in Table 1 means that the treatment liquid remained in two liquid phases before absorbing carbon dioxide, and did not form a single liquid phase. "Not separated" in Table 1 means that the treatment liquid remained in a single liquid phase, even after absorbing carbon dioxide.

Absorption conditions in the absorber 12 are preferably adjusted so as to make the treatment liquid remain in two liquid phases and can dissolve therein much carbon dioxide, and regeneration conditions in the regenerator 14 are preferably adjusted so as to make the treatment liquid inseparable into two liquid phases, and can dissolve therein less carbon dioxide. That is, the absorption and regeneration conditions are adjusted, depending on partial pressure of carbon dioxide, absorption temperature and regeneration temperature. This makes the treatment liquid more easily cause phase separation, and can thereby reduce difference between the regeneration temperature and the absorption temperature. In other words, the invention makes use of shift of concentration equilibrium of carbon dioxide absorption, caused by changes in the degree of absorption of carbon dioxide depending on temperature, and consequently by changes in easiness of phase separation. Hence, it becomes possible to suppress the difference between the regeneration temperature and the absorption temperature to a low level. In addition, with the gas hardly soluble to the treatment liquid fed into the regenerator 14, the difference between the regeneration temperature and the absorption temperature may further be narrowed.

Now a gas treatment method, using the gas treatment apparatus 10 of the first embodiment, will be described. The gas treatment method includes an absorption step, a liquid transfer step, and a regeneration step.

The absorption step is a step bringing, in the absorber 12, the gas to be treated into contact with the treatment liquid. To the absorber 12, there is fed the gas to be treated such as a process gas that contains at least carbon dioxide, through the feed channel 24. To the absorber 12, there is fed the absorption liquid, through the second flow channel 22 of the circulation channel 16. The absorption liquid flows down inside the absorber 12, comes into contact with carbon dioxide contained in the gas to be treated, and absorbs carbon dioxide. The absorber 12 thus pools the treatment liquid having absorbed carbon dioxide. In a case where the phase-separable treatment liquid is used, the treatment liquid having come into contact with the carbon dioxide is then separated into a first phase fraction with a high carbon dioxide content, and a second phase fraction with a low carbon dioxide content. The processed gas after being separated from carbon dioxide is discharged through the gas discharge channel 26 out of the absorber 12.

The liquid transfer step is a step for transferring the treatment liquid, pooled in the absorber 12, from the absorber 12 to the regenerator 14. In the liquid transfer step, the whole amount of the treatment liquid, output from the absorber 12, is introduced into the regenerator 14. The treatment liquid that flows through the first flow channel 21 in this process is heated in the heat exchanger 18 by the treatment liquid that flows through the second flow channel 22, and then introduced into the regenerator 14. By virtue of the pump 40 arranged to the first flow channel 21, the treatment liquid, even if kept in a phase-separated state in the absorber 12, may occasionally be introduced into the regenerator 14 with the first phase fraction and the second phase fraction mixed with each other.

The regeneration step is a step for separating carbon dioxide from the treatment liquid, by heating the treatment liquid introduced into the regenerator 14. In the regenerator 14, the treatment liquid is heated while flowing down. Meanwhile, the separation promoting gas, fed from the supply source 42b through the gas channel 42a into the regenerator 14, flows up inside the regenerator 14 and comes into contact with the treatment liquid. That is, in the regeneration step, the treatment liquid and the separation promoting gas flow in opposing directions to come into contact with each other. Since the treatment liquid in the regenerator 14 is heated in the presence of the separation promoting gas, so that the regeneration temperature of the carbon dioxide may be suppressed to a low level. The treatment liquid heated in the regenerator 14 may occasionally vaporize to generate water vapor. Carbon dioxide and the water vapor, separated from the treatment liquid, flow through the supply channel 30. While passing through the supply channel 30, the water vapor is condensed by the condenser 34, and returned back to the regenerator 14. Only carbon dioxide, separated from the treatment liquid, is thus fed to a supply destination. The treatment liquid pooled in the regenerator 14 flows through the second flow channel 22 back into the absorber 12. During this process, the treatment liquid gives heat, in the heat exchanger 18, to the treatment liquid that flows through the first flow channel 21, to thereby cool down in itself.

Figure 3:
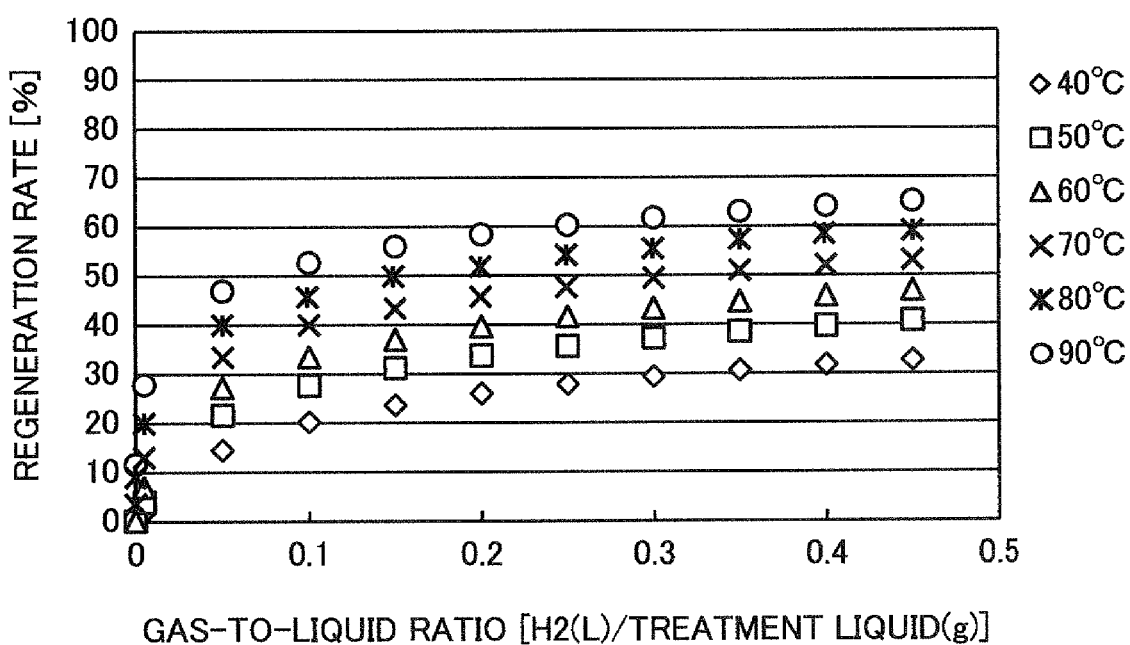
FIG. 3 is a drawing illustrating variable plots of regeneration rate (%) observed using the aqueous MEA solution, under varied regeneration temperatures.

Having confirmed that the separation promoting gas, fed into the regenerator 14, successfully improved the regeneration rate of carbon dioxide, now this point will further be described. FIGS. 2 and 3 illustrate regeneration rate (%) observed using an aqueous solution of an amine compound as the treatment liquid under varied regeneration temperatures. The treatment liquid was an aqueous solution containing 30% by mass of monoethanolamine (MEA) and 70% by mass of water. The absorption temperature was set to 40° C., and the partial pressure of carbon dioxide in the gas to be treated was 0.2 atm. Hydrogen gas was used as the separation promoting gas. Gas-to-liquid ratio was given by volume (liter) of the separation promoting gas per unit weight (1 g) of the treatment liquid.

As compared with the case free of the separation promoting gas (gas-to-liquid ratio=0), the cases with the separation promoting gas introduced therein were found to show improved regeneration rate of carbon dioxide, at any regeneration temperature. The regeneration rate can be improved by setting the regeneration temperature at high levels, and by setting the gas-to-liquid ratio again at high levels. Carbon dioxide could not be separated in the absence of the separation promoting gas unless the regeneration temperature was set to 70° C. or above. Now, introduction of the separation promoting could successfully release carbon oxide, even if the regeneration temperature was lowered down to 40° C., for example.

Figure 5:
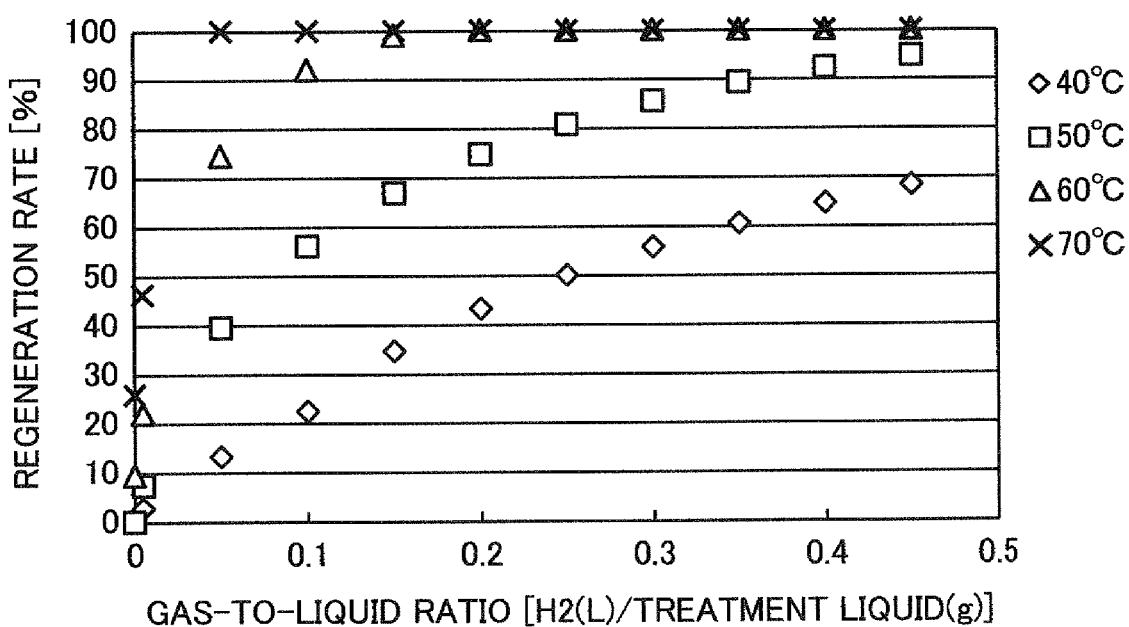
FIG. 5 is a drawing illustrating variable plots of regeneration rate (%) observed using the treatment liquid capable of causing phase separation upon absorbing carbon dioxide, under varied regeneration temperatures.

FIGS. 4 and 5 illustrate results obtained from cases where the treatment liquid capable of causing phase separation upon absorption of carbon dioxide was used. The amine compound contained in the treatment liquid was 2-(ethylamino)ethanol (EAE), and the organic solvent was diethylene glycol diethyl ether (DEGDEE). The treatment liquid contained 30% by mass of EAE, 60% by mass of DEGDEE, and 10% by mass of water. The absorption temperature was set to 40° C., and the partial pressure of carbon dioxide in the gas to be treated was 0.2 atm. Hydrogen gas was used as the separation promoting gas.

Even in the phase-separable treatment liquid, as with the MEA, as compared with the case free of the separation promoting gas (gas-to-liquid ratio=0), the cases with the separation promoting gas introduced therein were found to show improved regeneration rate of carbon dioxide, at any regeneration temperature. Moreover, the regeneration rate can be improved by setting the regeneration temperature at high levels, and by setting the gas-to-liquid ratio again at high levels. A regeneration rate of 100% was found to be achieved even at a regeneration temperature of 60° C., by adjusting the gas-to-liquid ratio to 0.2 or larger. Hence, use of the phase-separable treatment liquid can improve the regeneration rate, and can lower the regeneration temperature.

Figure 7:
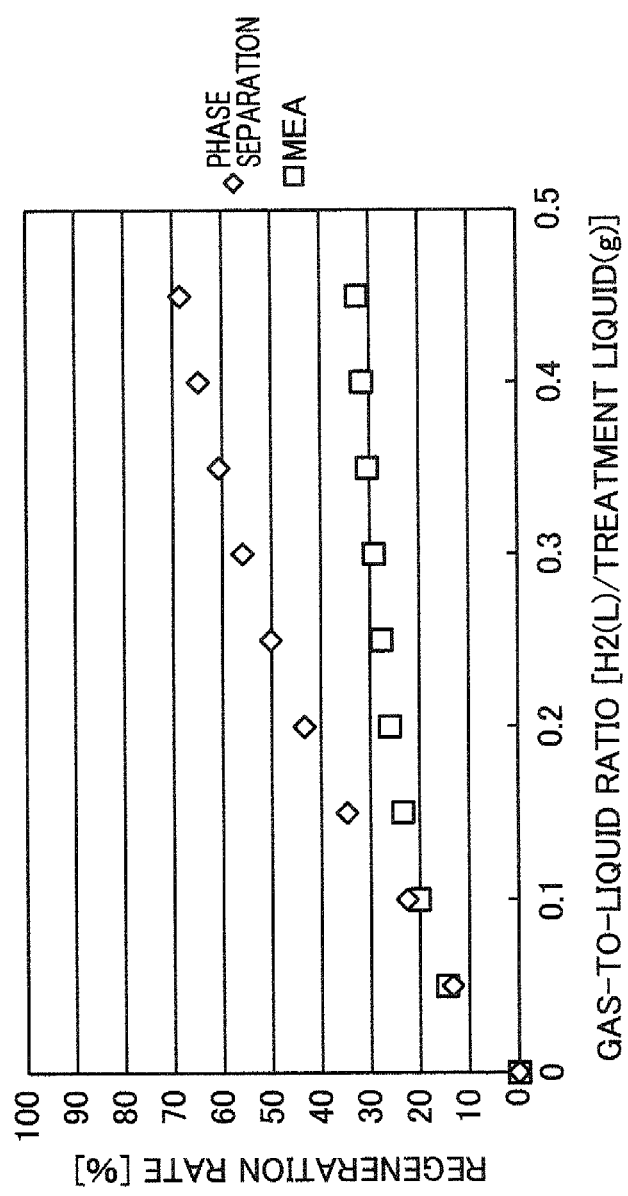
FIG. 7 is a drawing illustrating variable plots of regeneration rate (%) observed using the phase-separable treatment liquid and the aqueous MEA solution, both at an absorption temperature and a regeneration temperature of 40° C.
Figure 9:
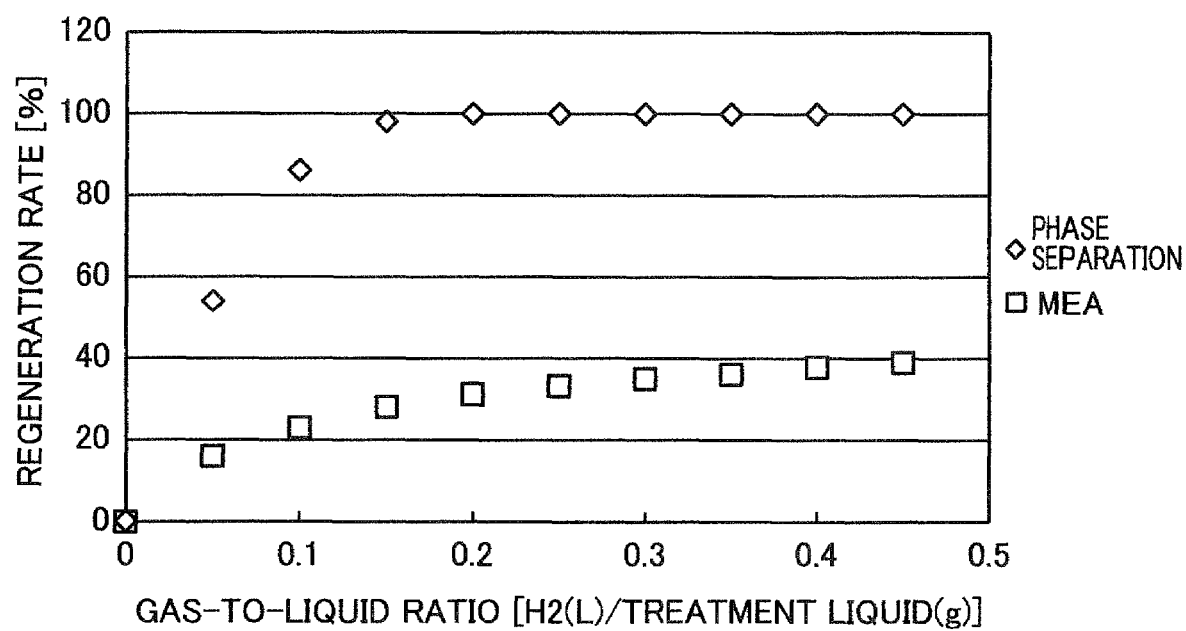
FIG. 9 is a drawing illustrating variable plots of regeneration rate (%) observed using the phase-separable treatment liquid and the aqueous MEA solution, both at an absorption temperature and a regeneration temperature of 60° C.

Next paragraphs will deal with comparison between the phase-separable treatment liquid and MEA. FIGS. 6 and 7 illustrate regeneration rate obtained from cases where both of the absorption temperature and the regeneration temperature were adjusted to 40° C., and the partial pressure of carbon dioxide in the gas to be treated was adjusted to 0.2 atm. The separation promoting gas was hydrogen gas. As known from FIGS. 6 and 7, both substances were found to be not so largely different from each other when the gas-to-liquid ratio is small (at around 0.05), but the phase-separable treatment liquid improved the regeneration rate more largely than MEA did, when the gas-to-liquid ratio was large. Moreover, the more the gas-to-liquid ratio increased, the more the difference expanded. Such tendency was observed, as illustrated in FIGS. 8 and 9, also when the absorption temperature and the regeneration temperature were adjusted to 60° C.

As described above, this embodiment brings, in the regeneration step, the separation promoting gas into contact with the treatment liquid. This makes the acidic compound, dissolved in the treatment liquid, more easily separable from the treatment liquid, and what is better, the separated acidic compound is purged from the treatment liquid, while being entrained with the gas. Separation of the acidic compound from the treatment liquid is thus promoted. Hence, the regeneration temperature in the regenerator 14 may be set to a further lowered level, and this enables separation of the acidic compound at lower energy consumption.

In a case where the treatment liquid capable of causing phase separation upon absorbing carbon dioxide is used, the regeneration step serves to separate carbon dioxide from the treatment liquid by not only bringing the separation promoting gas into contact with the treatment liquid, but also by presenting the acidic compound-deficient phase fraction. Hence, the energy required for regeneration of the treatment liquid may further be reduced.

Second Embodiment

Figure 10:
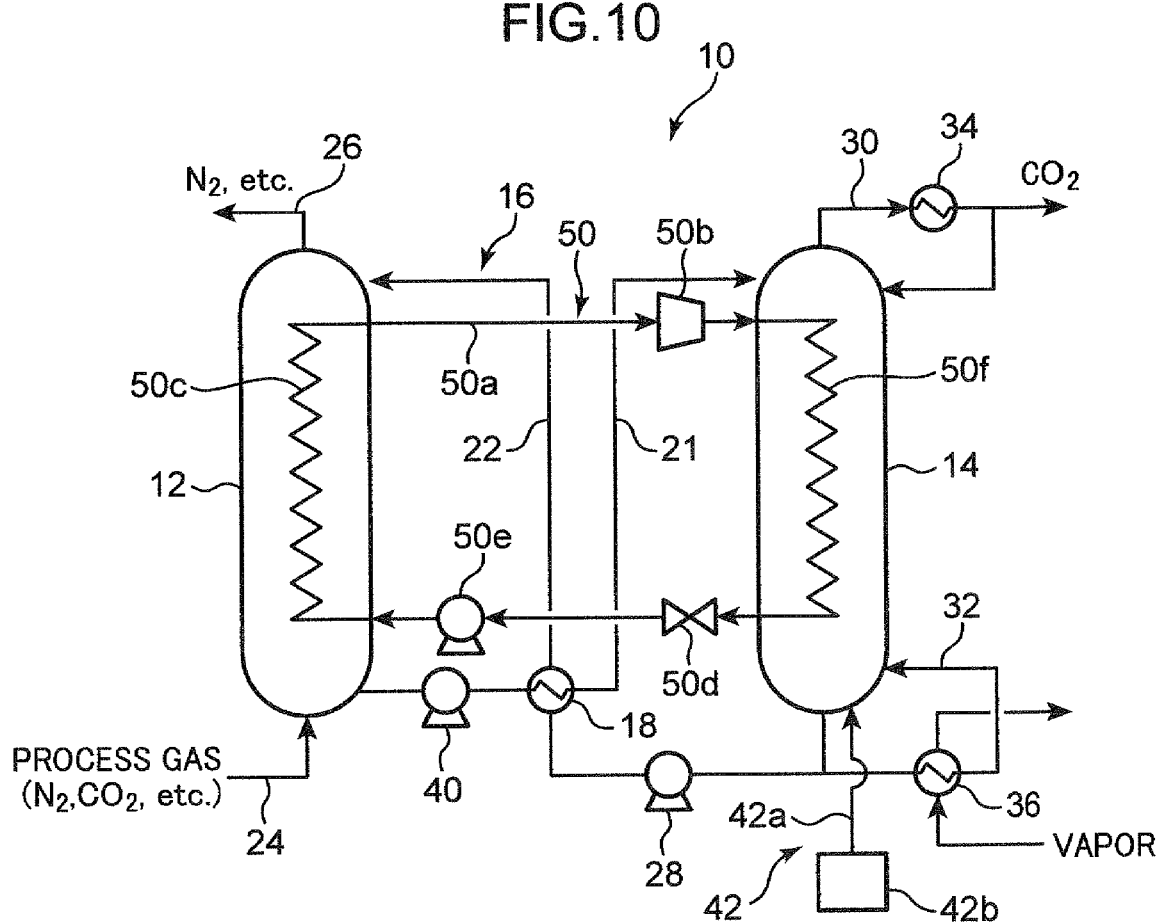
FIG. 10 is a drawing schematically illustrating an overall structure of a gas treatment apparatus according to a second embodiment.

FIG. 10 illustrates a second embodiment of the present invention. All constituents same as those in the first embodiment will be given the same reference sings, and will not be detailed redundantly.

The gas treatment apparatus 10 of the second embodiment includes heat transfer means (heat pump) 50 for transferring reaction heat generated in the absorber 12 to the regenerator 14. The heat transfer means 50 has a closed-loop circulation flow channel 50a having a coolant enclosed therein; and a compressor 50b, an evaporator 50c, an expansion mechanism 50d, a pump 50e and a condenser 50f, all of which being arranged on the circulation flow channel 50a. The evaporator 50c is typically composed of a heat transfer tube, and is arranged inside the absorber 12. In the absorber 12, an exothermic reaction occurs upon absorption of carbon dioxide by the treatment liquid. The coolant in the liquid state that flows through the evaporator 50c can evaporate upon being heated by the heat. The coolant in the gas state is compressed by the compressor 50b and flows into the condenser 50f. The condenser 50f is typically composed of a heat transfer tube, and is arranged inside the regenerator 14. In the regenerator 14, an endothermic reaction occurs upon release of carbon dioxide from the treatment liquid. The coolant in the gas state that flows through the condenser 50f is condensed by the endothermic reaction. The thus condensed liquid-state coolant is allowed to expand by the expansion mechanism 50d, transferred by the pump 50e, and fed into the evaporator 50c. The reaction heat generated in the absorber 12 is thus transferred to the regenerator 14, by means of circulation of the coolant.

The second embodiment thus enables use of the reaction heat in the absorber 12 for regeneration of the treatment liquid, and can thereby further reduce energy required for regenerating the treatment liquid.

All other structures, operations and effects, although will not be described here, are same as those in the first embodiment.

Third Embodiment

As described in the first embodiment, the treatment liquid can be regenerated by adjusting the gas-to-liquid ratio to a high level, even if the regeneration temperature and the absorption temperature are almost comparable. With the gas-to-liquid ratio further elevated, the regeneration temperature can now be set lower than the absorption temperature. In this case, the reaction heat in the absorber 12 can be transferred to the regenerator 14, through direct heat exchange between the absorber 12 and the regenerator 14. The energy consumption rate in this process is given by 0 GJ/ton-CO2.

Figure 11:
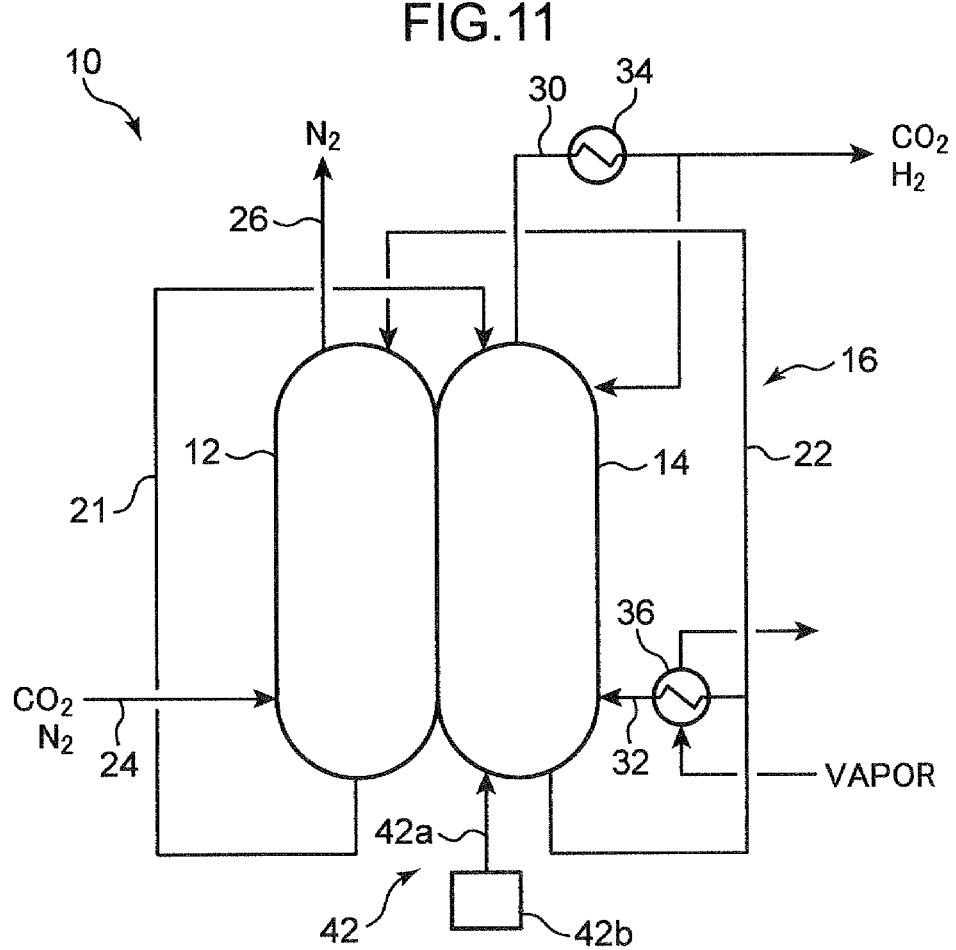
FIG. 11 is a drawing schematically illustrating an overall structure of a gas treatment apparatus according to a third embodiment.

The absorber 12 and the regenerator 14 are in direct contact with each other as illustrated in FIG. 11. Hence, the wall face, over which the absorber 12 and the regenerator 14 come into contact, can serve as a heat transfer surface. The reaction heat in the absorber 12 is transferred through this surface to the regenerator 14. Pressurizing inside the absorber 12 can further elevate the temperature of the treatment liquid in the absorber 12, and can thereby further effectively transfer the heat from the absorber 12 to the regenerator 14.

The third embodiment enables use of the reaction heat in an absorber for regeneration of the treatment liquid, and can thereby further reduce energy required for regenerating the treatment liquid. Moreover, the embodiment no longer needs motive power for heat transfer unlike the heat pump, and can thereby further reduce the energy required for regeneration.

All other structures, operations and effects, although will not be described here, are same as those in the first embodiment.

Fourth Embodiment

Figure 12:
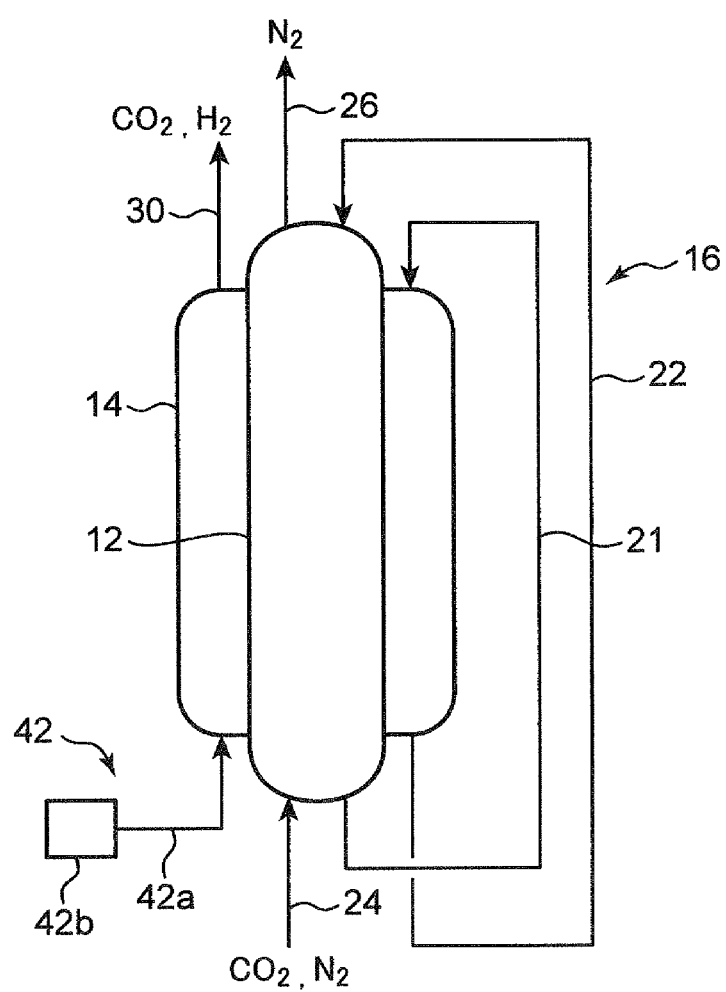
FIG. 12 is a drawing schematically illustrating an overall structure of a gas treatment apparatus according to a fourth embodiment.

FIG. 12 illustrates a fourth embodiment of the present invention. The fourth embodiment is similar to the third embodiment in that the absorber 12 and the regenerator 14 can exchange heat directly, except that the fourth embodiment employs a double-tube structure. That is, the regenerator 14 has a cylindrical shape, and the absorber 12 is arranged inside the cylinder. The outer circumferential surface of the absorber 12 and the inner circumferential surface of the regenerator 14 come into contact with each other to form a contact surface, which serves as a heat transfer surface. Now the absorber 12 may alternatively be formed in a cylindrical shape, with the regenerator 14 arranged inside the cylinder.

All other structures, operations and effects, although will not be described here, are same as those in the third embodiment.

The embodiment will be outlined.

(1) According to the above embodiment, there is provided a gas treatment method including an absorption step in which a gas to be treated containing an acidic compound is brought into contact, in an absorber, with a treatment liquid for absorbing the acidic compound, and a regeneration step in which the treatment liquid, having the acidic compound absorbed therein, is sent to a regenerator, and the treatment liquid is then heated to separate the acidic compound from the treatment liquid. In the regeneration step, a gas almost insoluble to the treatment liquid is fed to the regenerator, and the gas almost insoluble to the treatment liquid is then brought into contact with the treatment liquid.

In the regeneration step of the embodiment, the gas almost insoluble to the treatment liquid is brought into contact with the treatment liquid. This makes the acidic compound, dissolved in the treatment liquid, more easily separable from the treatment liquid, and what is better, the separated acidic compound is purged from the treatment liquid, while being entrained with the gas. Separation of the acidic compound from the treatment liquid is thus promoted. Hence, the regeneration temperature in the regenerator may be set to a further lowered level, and this enables separation of the acidic compound at lower energy consumption.

(2) The gas treatment method may use heat transfer means for transferring reaction heat, generated in the absorber, to the regenerator. This embodiment enables use of the reaction heat in an absorber for regeneration of the treatment liquid, and can thereby further reduce energy required for regenerating the treatment liquid.

(3) In the gas treatment method, the absorber and the regenerator may exchange heat directly. By increasing the feed volume of the gas almost insoluble to the treatment liquid to the regenerator, it now becomes possible to equalize the temperatures of the absorber and the regenerator, or to set the temperature of the regenerator lower than the temperature of the absorber. This enables direct exchange of the reaction heat generated in the absorber to the regenerator. This enables use of the reaction heat in the absorber for regeneration of the treatment liquid without using the power of a pump or the like, and can thereby further reduce energy required for regenerating the treatment liquid.

(4) In the gas treatment method, difference of temperature of the absorber from temperature of the regenerator may fall in a range from −20° C. to 30° C.

(5) In the gas treatment method, in the regeneration step, 0.05 liters or more of the gas, per 1 g of the treatment liquid, may be fed to the regenerator. This embodiment can exert an effect of promoting separation of the acidic compound from the treatment liquid in a more efficient manner.

(6) In the gas treatment method, the treatment liquid may cause phase separation, upon absorbing the acidic compound, into phases with different content proportions of the acidic compound. This embodiment separates the acidic compound from the treatment liquid in the regenerating step, not only by bringing the gas, almost insoluble to the treatment liquid, into contact with the treatment liquid, but also by allowing the acidic compound-deficient phase fraction to coexist. Hence, the energy required for regeneration of the treatment liquid may further be reduced.

(7) According to the above embodiment, there is provided a gas treatment apparatus that uses a gas to be treated containing an acidic compound, and a treatment liquid for absorbing the acidic compound, to thereby separate the acidic compound from the gas to be treated, the gas treatment apparatus including an absorber configured to bring the treatment liquid into contact with the gas to be treated, a regenerator configured to heat the treatment liquid, having been brought into contact in the absorber with the gas to be treated, to thereby separate the acidic compound, and a gas feeding unit for feeding a gas almost insoluble to the treatment liquid to the regenerator.

(8) The gas treatment apparatus may further include means for transferring reaction heat generated in the absorber to the regenerator.

(9) In the gas treatment apparatus, the absorber and the regenerator may be configured to exchange heat directly.

(10) In the gas treatment apparatus, difference of temperature of the absorber from temperature of the regenerator may fall in a range from −20° C. to 30° C.

(11) In the gas treatment apparatus, the gas feeding unit may feed 0.05 liters or more of the gas, per 1 g of the treatment liquid, to the regenerator.

(12) In the gas treatment apparatus, the treatment liquid may cause phase separation, upon absorbing the acidic compound, into phases with different content proportions of the acidic compound.

As described above, in the above-described embodiment, it is possible to reduce the energy required for separating and recovering the acidic compound.

The invention claimed is:

1. A gas treatment method, the method comprising:
bringing a gas comprising an acidic compound into contact with a treatment liquid in an absorber, such that the acidic compound is absorbed in the treatment liquid and that the treatment liquid in the absorber is separated into multiple phases having different concentrations of the acidic compound; and
regenerating the acid compound by sending the treatment liquid in which the acidic compound is absorbed to a regenerator, and heating the treatment liquid in the regenerator to separate the acidic compound from the treatment liquid,
wherein the regenerating comprises feeding a gas almost insoluble to the treatment liquid to the regenerator, and bringing the gas almost insoluble to the treatment liquid into contact with the treatment liquid.

2. The gas treatment method according to claim 1, further comprising:
transferring reaction heat, generated in the absorber, to the regenerator with heat transfer means.

3. The gas treatment method according to claim 1, wherein the absorber and the regenerator exchange heat directly.

4. The gas treatment method according to claim 1, wherein a difference of a temperature of the absorber from a temperature of the regenerator falls in a range from −20° C. to 30° C.

5. The gas treatment method according to claim 1, wherein the regenerating comprises feeding 0.05 liters or more of the gas, per 1 g of the treatment liquid, to the regenerator.

6. The gas treatment method according to claim 1, wherein in the bringing, the treatment liquid in the absorber is separated into two phases having different concentrations of the acidic compound.

7. The gas treatment method according to claim 1, wherein the treatment liquid is in a single liquid phase prior to the bringing, and upon absorbing the acidic compound in the bringing, the treatment liquid is separated into multiple liquid phases having different concentrations of the acidic compound.

8. The gas treatment method according to claim 1, wherein the treatment liquid comprises an amine compound and an organic solvent.

9. The gas treatment method according to claim 8, wherein a difference between a solubility parameter of the organic solvent and a solubility parameter of the amine compound is from 1.1 $(cal/cm^3)^{1/2}$ to 4.2 $(cal/cm^3)^{1/2}$.

10. A gas treatment apparatus, comprising:
an absorber configured to bring a treatment liquid into contact with a gas to be treated comprising an acidic compound such that the acidic compound is absorbed in the treatment liquid;
a regenerator configured to heat the treatment liquid in which the acidic compound is absorbed to thereby separate the acidic compound from the treatment liquid; and
a gas feeding unit for feeding a gas almost insoluble to the treatment liquid to the regenerator,
wherein, upon absorbing the acidic compound, the treatment liquid is separated into multiple phases having different concentrations of the acidic compound.

11. The gas treatment apparatus according to claim 10, further comprising:
  means for transferring reaction heat generated in the absorber to the regenerator.

12. The gas treatment apparatus according to claim 10, wherein the absorber and the regenerator are configured to exchange heat directly.

13. The gas treatment apparatus according to claim 10, wherein a difference of a temperature of the absorber from a temperature of the regenerator falls in a range from −20° C. to 30° C.

14. The gas treatment apparatus according to claim 10, wherein the gas feeding unit is configured to feed 0.05 liters or more of the gas, per 1 g of the treatment liquid, to the regenerator.

15. The gas treatment apparatus according to claim 10, wherein, upon absorbing the acidic compound, the treatment liquid is separated into two phases having different concentrations of the acidic compound.

16. The gas treatment apparatus according to claim 10, further comprising:
  the treatment liquid contained in the absorber.

17. The gas treatment apparatus according to claim 16, wherein the treatment liquid is in a single liquid phase, and upon absorbing the acidic compound, the treatment liquid is separated into multiple liquid phases having different concentrations of the acidic compound.

18. The gas treatment apparatus according to claim 16, wherein the treatment liquid comprises an amine compound and an organic solvent.

19. The gas treatment apparatus according to claim 18, wherein a difference between a solubility parameter of the organic solvent and a solubility parameter of the amine compound is from 1.1 $(cal/cm^3)^{1/2}$ to 4.2 $(cal/cm^3)^{1/2}$.

* * * * *